(No Model.) 2 Sheets—Sheet 1.
G. F. GREEN.
ELECTRICAL RAILWAY.
No. 465,432. Patented Dec. 15, 1891.
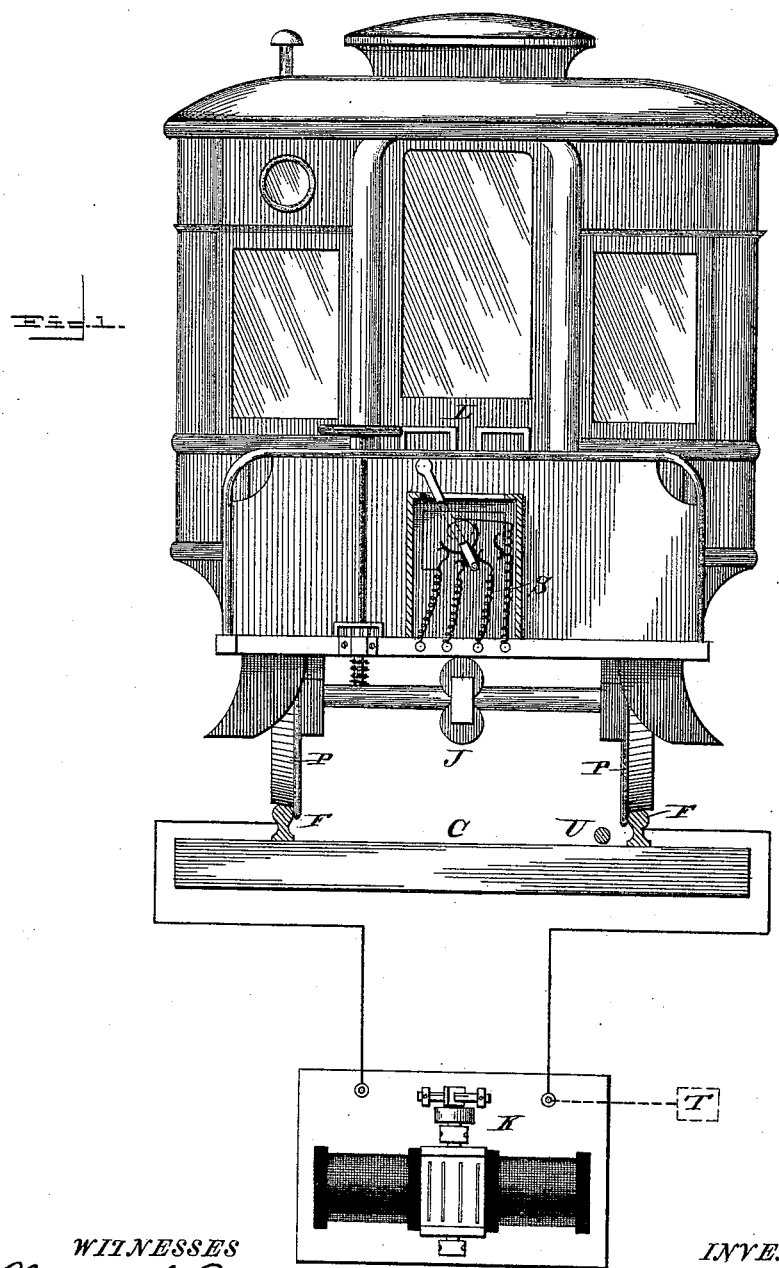
WITNESSES
INVENTOR (No Model.) 2 Sheets—Sheet 2.
G. F. GREEN.
ELECTRICAL RAILWAY.
No. 465,432. Patented Dec. 15, 1891.
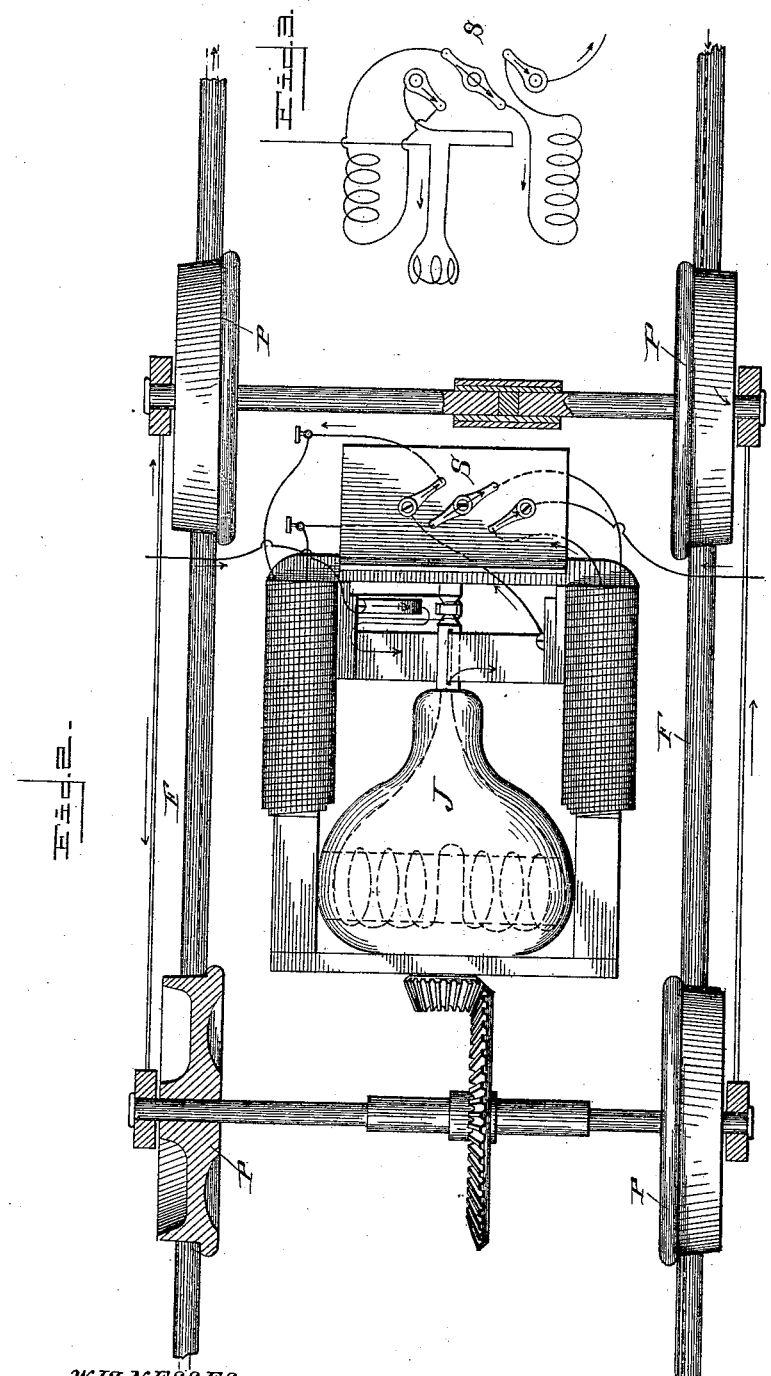
WITNESSES
INVENTOR
George F. Green
by Butterworth, Hall, Brown & Smith
his Attorneys

UNITED STATES PATENT OFFICE.

GEORGE F. GREEN, OF KALAMAZOO, MICHIGAN, ASSIGNOR, BY DIRECT AND MESNE ASSIGNMENTS, TO OLIVER S. KELLY, OF SPRINGFIELD, OHIO.

ELECTRICAL RAILWAY.

SPECIFICATION forming part of Letters Patent No. 465,432, dated December 15, 1891.

Application filed May 15, 1886. Serial No. 202,287. (No model.)

*To all whom it may concern:*

Be it known that I, GEORGE F. GREEN, of Kalamazoo, in the county of Kalamazoo and State of Michigan, have invented new and useful Improvements in Propelling Cars by Electricity upon Railway-Tracks, which invention is fully set forth in the following specification, reference being had to the accompanying drawings, wherein—

Figure 1 is a vertical transverse section of the track and an end elevation of the vehicle thereon. Fig. 2 is a plan view, partly in section, showing an electro-magnetic motor applied to a vehicle upon the track. Fig. 3 is a diagram showing the current through the motor represented in Fig. 2, but in a direction opposite to their direction in said Fig. 2.

The purpose I have in view is to embrace in this specification an electric railway substantially of the character described in my pending application for electric track and insulator, filed complete September 15, 1879, the invention in this specification differing from that described in said application in this—that in this I have described a dynamo-electric generator as the preferred form of electrical supply, while in said application any source of electrical energy was described, but no particular kind was indicated as preferred, and, further, that in this application I specifically describe and illustrate a circuit-controlling device placed on the car, such circuit-controller not being specifically described in my original application of August 19, 1879.

The object of my invention is to propel vehicles upon a railway-track by electricity without transporting the source of electric energy. I therefore locate said source at the end of the track or at convenient points along the track and let the engines only travel with the cars.

My invention essentially consists of a railway-track with one or more stationary dynamo-electric generators, electrical conductors extending from said generator or generators along the line of said track and consisting wholly or in part of the rails thereof, vehicles movable along said track, electro-dynamic motors fixed upon said vehicles for imparting motion thereto, and wheels supporting said vehicles upon the track and also serving to maintain continuous electrical connection between said generators and motors. The dynamo-electrical machines are driven by suitable prime motors, and one rail of the track may be connected with one pole of said dynamo and the other rail of said track may be connected with the other pole of said generator to complete a circuit through said generators and motors.

C is one of the cross-ties whereon the metallic rails F F are supported. The rails F F, one or both, are properly and efficiently insulated to prevent the escape of the electrical current.

K is a stationary dynamo-electrical machine in electrical connection with one or both of the rails F F. In case one rail only is insulated the return current may be taken back by ground, as indicated by dotted lines at T, Fig. 1, or by means of an independent conductor, as indicated at U, Fig. 1.

L is the car supported upon the wheels P P, which are adapted to travel on the rails F. The wheels P are insulated from each other and from the frame-work of the car; but one of said wheels is in electrical connection with one pole of the electro-dynamic motor J and the other wheel is in electrical connection with the other pole of said motor.

The motor J may be constructed in any approved way to constitute an electro-dynamic motor and may be attached to the car in any suitable way.

In Fig. 2 I have by way of illustration represented an efficient motor such as has been used by me, and is shown and described in my patent, No. 184,469, dated November 21, 1876, through the coil of which the electric current flows continuously, the said coil being constantly excited so long as the poles of the motor are in circuit with the electric generator, whereby a positive and continuous propelling force is transmitted to the driving-wheels of the car. In Fig. 3 I have represented the path of the current passing through the said motor. A pole-changing switch S of some proper kind is employed to reverse the current through said motor, thereby to reverse the direction of the revolution of the same to propel the car in an opposite direction.

In Figs. 2 and 3 the pole-changing switch is shown in different positions, and in Fig. 3 the current is reversed in direction from Fig. 2.

Having described my invention, I claim—

1. The combination of one or more stationary sources of electric current, a conducting-circuit formed wholly or in part of an insulated line of rails of a railway-track, a wheeled vehicle movable upon or along said line of rails, one or more rotating electric dynamic motors mounted upon said vehicle for propelling the same and included in said circuit of conductors, and a circuit-controller placed on said vehicle and also included in said line of conductors, substantially as described.

2. The combination of one or more stationary sources of electric current, the conducting-circuit formed wholly or in part of an insulated line of rails of a railway-track, a wheeled vehicle movable upon or along said line of rails, one or more rotating electric dynamic motors, whose coils are continuously excited so long as the poles of said motors are in circuit with the means of electric supply, mounted upon said vehicle for propelling the same and included in said circuit of conductors, and a circuit-controller placed on said vehicle and also included in said line of conductors, substantially as described.

3. The combination of one or more sources of electric supply, a railway-track, a wheeled vehicle moving upon or along said track, a conducting-circuit composed wholly or in part of insulated conductors extending along the line of travel of said vehicle, one or more rotating electric motors mounted upon said vehicle for propelling the same and included in said circuit of conductors, and a circuit-controller placed on said vehicle and also included in said circuit of conductors, substantially as described.

GEORGE F. GREEN.

Witnesses:
ABE H. OLIVER,
S. C. BALDWIN.